No. 630,336.  
W. S. FOSTER.  
CANDY CLEANING MACHINE.  
(Application filed Jan. 13, 1899.)  
Patented Aug. 8, 1899.
(No Model.)
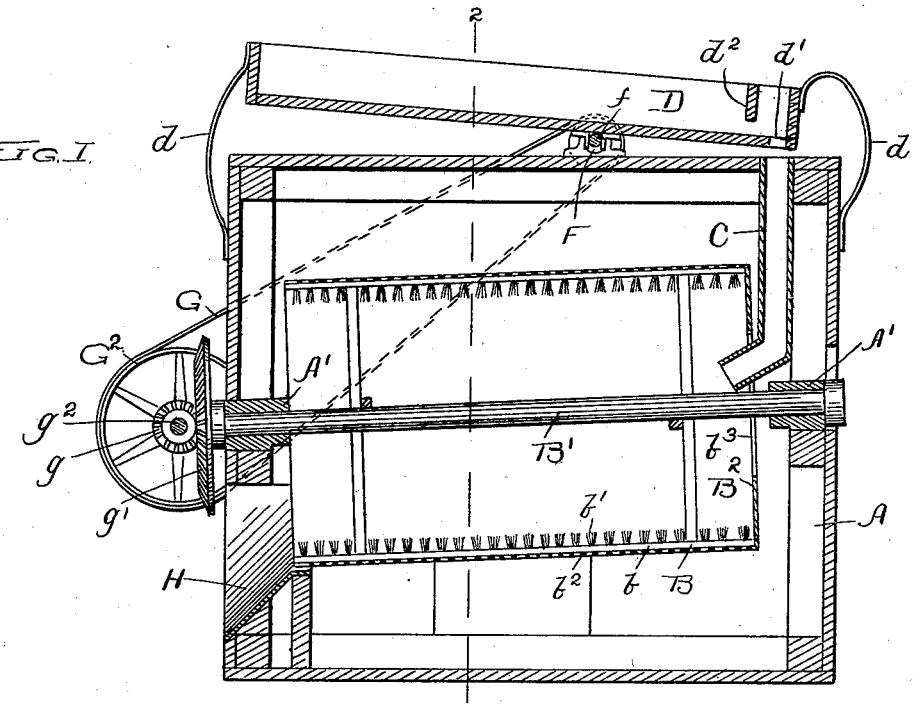
FIG. I.
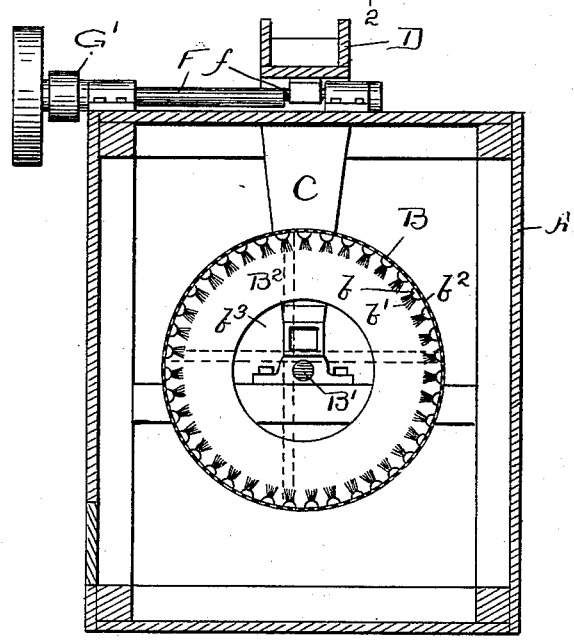
FIG. 2.
WITNESSES:  
Sew. E. Curtis  
H. W. Munday
INVENTOR:  
WILLIAM S. FOSTER  
BY Munday, Evarts & Adcock  
HIS ATTORNEYS.
THE NORRIS PETERS CO., PHOTO-LITHO., WASHINGTON, D. C.

UNITED STATES PATENT OFFICE.

WILLIAM S. FOSTER, OF CHICAGO, ILLINOIS, ASSIGNOR TO HIMSELF AND HARRY HILL, OF SAME PLACE.

CANDY-CLEANING MACHINE.

SPECIFICATION forming part of Letters Patent No. 630,336, dated August 8, 1899.

Application filed January 13, 1899. Serial No. 702,096. (No model.)

*To all whom it may concern:*

Be it known that I, WILLIAM S. FOSTER, a citizen of the United States, residing in Chicago, in the county of Cook and State of Illinois, have invented a new and useful Improvement in Candy-Cleaning Machines, of which the following is a specification.

My invention relates to candy-cleaning machines.

Heretofore the starch or dry powdery material adhering to candies which have been molded in starch or other dry powdery material has generally in actual practice been cleaned from the candies by hand-brushing.

The object of my invention is to provide a machine or apparatus of a simple, efficient, and durable construction for automatically doing this work and which can be safely relied upon to perfectly clean each and every piece of candy that passes through it, and thus turn out a uniform and perfect product.

My invention consists in the means I employ to accomplish this object or result—that is to say, it consists in the combination, with a shaking or vibrating hopper which performs the function of delivering the candies in a regular and uniform manner, of a rotating inclined cylinder armed with brushes on its inner surface or periphery, into which the candies are delivered from the vibrating trough or hopper at the higher end and through which, owing to the inclination of the cylinder, the candies slowly pass from the higher to the lower end thereof, being constantly tumbled about and thoroughly brushed by the rotation of the cylinder as they pass through the same from one end to the other. The brush-cylinder by reason of its rotation and its brush-surface upon its inner periphery tends continually to carry the candies up to a certain height, when they tumble and roll back over the brushes to a lower point, thus causing the candies to gently rub themselves against the brushes by their own gravity and weight, while the brushes also to some extent have a rubbing action against the mass of candies in the cylinder, the candies tending to remain in the lowest position, while the brushes move beneath them by reason of the rotation of the brush-cylinder. By this simple means I have discovered that candies molded in starch or dry powdery material may be thoroughly and perfectly cleaned from all dry powdery material adhering thereto with great rapidity and cheapness and so much more perfectly than they have heretofore been cleaned by hand that the saving in starch alone from the use of my machine amounts to a large sum in an ordinary candy-factory.

My invention also consists in the novel construction of parts and devices and in the novel combinations of parts and devices herein shown and described, and specified in the claims.

In the accompanying drawings, forming a part of this specification, Figure 1 is a central vertical longitudinal section of a machine or apparatus embodying my invention, and Fig. 2 is a vertical cross-section on line 2 2 of Fig. 1.

In said drawings, A represents a box or case in which the inclined brush-cylinder is mounted, the same serving also as the frame or support for the other parts.

B is the inclined rotating brush-cylinder, the same being preferably made of tin or sheet metal and having secured on its inner surface a series of brush-slats $b$, armed with bristles or brushes $b'$. The brush-cylinder is also provided with a series of perforations $b^2$ for the starch or dry powdery material loosened from the candies to pass or sift through, the rotating cylinder thus not only serving to brush or loosen the starch or dry powdery material from the candies, but also acting as a sieve to separate the same therefrom. The brushes are located close enough together both longitudinally of the cylinder and circumferentially thereof in respect to the size of the candies being operated upon to prevent the candies from lodging between the brushes.

B' is the shaft to which the brush-cylinder is secured, and A' the journals or bearings in which it is mounted.

C is the candy-delivery spout, through which the candies are passed into the higher end of the brush-cylinder from the shaking or vibrating inclined candy-delivery hopper or trough D.

The hopper or trough D is supported by springs $d\ d$, one at each end, so that it may be readily vibrated as required.

F is a rotating shaft extending under the inclined vibrating candy-delivery trough or hopper D, the same being provided with a knocker, projection, or arm $f$ to engage the bottom of the hopper, and thus agitate the same.

The inclined hopper or trough D is provided with a slot $d'$ at its lower end, through which the candies escape, and with a gate $d^2$ near its lower end to secure the uniform and regular delivery of the candies from the inclined trough or hopper to the inclined rotating brush-cylinder B.

The inclined brush-cylinder B is rotated as required from the knocker-shaft F by means of the connecting belt and pulleys G $G'$ $G^2$ and the bevel-gears $g\ g'$, the gear $g'$ being on the brush-shaft $B'$ and the gear $g$ on the shaft $g^2$ of the pulley $G^2$.

H is the discharge-spout for the candies.

The brush-cylinder B is open at its lower end for its full diameter; but at its upper end it is preferably provided with a head $B^2$, having an opening $b^3$, through which the lower end of the connecting-spout C is projected.

The case or box A serves to receive and confine the starch or dry powdery material cleaned from the candies.

As will be readily understood from the drawings, the series of closely-placed brushes $b'$ form a continuous rotating vessel or holder, through which the candies pass from one end to the other and by the action of which the starch or dry powdery material is loosened and cleaned from the candies as they pass through the holder or vessel. This holder or vessel is preferably of a cylindrical form, as shown in the drawings, although it will be understood by those skilled in the art that it may be made of other forms without departing from the principle of my invention, and by use of the term "cylinder" in this specification and claims I do not wish to be understood as meaning a vessel necessarily of the same diameter at both ends nor one which is necessarily circular in cross-section, and it will be understood that the inclination of the brush-cylinder, vessel, or holder relates to the inclination of its lower portion, upon which the candies rest while passing through the machine and which causes the candies to feed or pass through the machine by gravity as the cylinder, vessel, or holder rotates. If the cylinder, vessel, or holder is not of the same diameter at both ends, this inclination of the lower portion thereof upon which the candies rest may of course be secured without necessarily inclining the axis of the holder or vessel.

I claim—

1. The candy-cleaning machine, consisting in the combination of a vibrating inclined candy-delivery hopper or trough, with an inclined rotating perforated brush-cylinder armed with brushes on its inner surface or periphery, substantially as specified.

2. The candy-cleaning machine, consisting in the combination of a vibrating inclined candy-delivery hopper or trough, with an inclined rotating perforated brush-cylinder armed with brushes on its inner surface or periphery, and a case or box inclosing the brush-cylinder, substantially as specified.

3. The candy-cleaning machine, consisting in the combination of a vibrating inclined candy-delivery hopper or trough, with an inclined rotating perforated brush-cylinder armed with brushes on its inner surface or periphery, a case or box inclosing the brush-cylinder, and a connecting-spout leading from the delivery hopper or trough to the higher end of the inclined brush-cylinder, substantially as specified.

4. The candy-cleaning machine, consisting in the combination of a vibrating inclined candy-delivery hopper or trough, with an inclined rotating perforated brush-cylinder armed with brushes on its inner surface or periphery, a case or box inclosing the brush-cylinder, a connecting-spout leading from the delivery hopper or trough to the higher end of the inclined brush-cylinder, and a candy-discharge spout, substantially as specified.

5. The candy-cleaning machine, consisting in the combination of a vibrating inclined candy-delivery hopper or trough, with an inclined rotating perforated brush-cylinder armed with brushes on its inner surface or periphery, a rotating shaft armed with a knocker or projection for vibrating the candy-delivery hopper or trough, and a belt and gearing connecting said knocker-shaft with the brush-shaft, substantially as specified.

6. In a candy-cleaning machine, a rotating brush-armed vessel or holder, the brushes being upon the inner surface or periphery thereof, and through which the candies are adapted to pass by gravity as the vessel rotates, the rotation of the brush vessel or holder cleaning the candies, substantially as specified.

7. In a candy-cleaning machine, a rotating series of brushes arranged close together to form a continuous rotating holder or vessel for the candies as they pass from one end thereof to the other, substantially as specified.

8. In a candy-cleaning machine, a rotating series of brushes arranged close together to form a continuous rotating holder or vessel for the candies as they pass from one end thereof to the other, in combination with a trough or hopper for delivering the candies to the series of brushes, substantially as specified.

WILLIAM S. FOSTER.

Witnesses:
H. M. MUNDAY,
EDMUND ADCOCK.